United States Patent
Masterman

(10) Patent No.: US 10,078,860 B1
(45) Date of Patent: Sep. 18, 2018

(54) METHOD, MEDIUM, AND SYSTEM FOR MANAGING ORDERS BASED ON EXPIRATION DATE

(71) Applicant: Amazon Technologies, Inc., Reno, NV (US)

(72) Inventor: Michael Frederick Masterman, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 941 days.

(21) Appl. No.: 14/313,100

(22) Filed: Jun. 24, 2014

(51) Int. Cl.
*G06Q 30/00* (2012.01)
*G06Q 30/06* (2012.01)

(52) U.S. Cl.
CPC .............................. *G06Q 30/0633* (2013.01)

(58) Field of Classification Search
CPC ......... G06K 2017/0051; G06Q 10/087; G06Q 30/203; G06Q 30/0633
See application file for complete search history.

(56) References Cited

U.S. PATENT DOCUMENTS

| | | | | |
|---|---|---|---|---|
| 6,622,127 B1* | 9/2003 | Klots | ............... | G06F 17/30902 705/22 |
| 6,965,871 B1* | 11/2005 | Szabo | .................. | G06Q 10/087 186/56 |
| 2002/0188499 A1* | 12/2002 | Jenkins | ............... | G06Q 10/087 705/28 |
| 2003/0061147 A1* | 3/2003 | Fluhr | ..................... | G06Q 30/06 705/37 |
| 2009/0326829 A1* | 12/2009 | Liamos | ............... | G06F 19/3456 702/19 |
| 2012/0136741 A1* | 5/2012 | Agarwal | ................ | G06Q 10/00 705/26.1 |

OTHER PUBLICATIONS

Kempiak, Mike, and Mark A. Fox. "Online Grocery Shopping: Consumer Motives, Concerns, and Business Models (originally published in Aug. 2002)." First Monday (2006). (Year: 2006).*

* cited by examiner

*Primary Examiner* — Matthew E Zimmerman
(74) *Attorney, Agent, or Firm* — Kilpatrick Townsend & Stockton LLP

(57) ABSTRACT

Past order history of a user of an electronic marketplace may be obtained, the past order history indicating at least one-previously delivered item. A particular item of the item type may be selected based at least part on an expiration date associated with the particular item and one or more replenishment dates associated with the previously-delivered item. An automated order may be generate that cases the selected item to be shipped to the user.

19 Claims, 8 Drawing Sheets

METHOD, MEDIUM, AND SYSTEM FOR MANAGING ORDERS BASED ON EXPIRATION DATE

BACKGROUND

Retailers often keep an inventory of goods in distribution centers for later distribution to their customers. These goods are sometimes associated with expiration dates. In response to a customer order, the retailer may retrieve, pack, and/or ship the item to the customer. The storage of a wide variety of items can present certain concerns for the retailer with regard to delivering the items prior to expiration. Managing large inventories of items can be cumbersome for distribution centers that store perishable items, for example, because the expiration dates can occur frequently. In some cases, the customer has the ability to request that a particular item be provided to him or her on a recurring schedule. As distribution centers and the retailers that utilize them grow, managing these inventories and recurring deliveries may pose challenges to retailers and distribution centers alike.

Conventional attempts to solve these problems are ineffective and/or have undesirable side effects or other drawbacks with respect to at least one significant use case.

BRIEF DESCRIPTION OF THE DRAWINGS

Various embodiments in accordance with the present disclosure will be described with reference to the drawings, in which.

DETAILED DESCRIPTION

Figure 1:
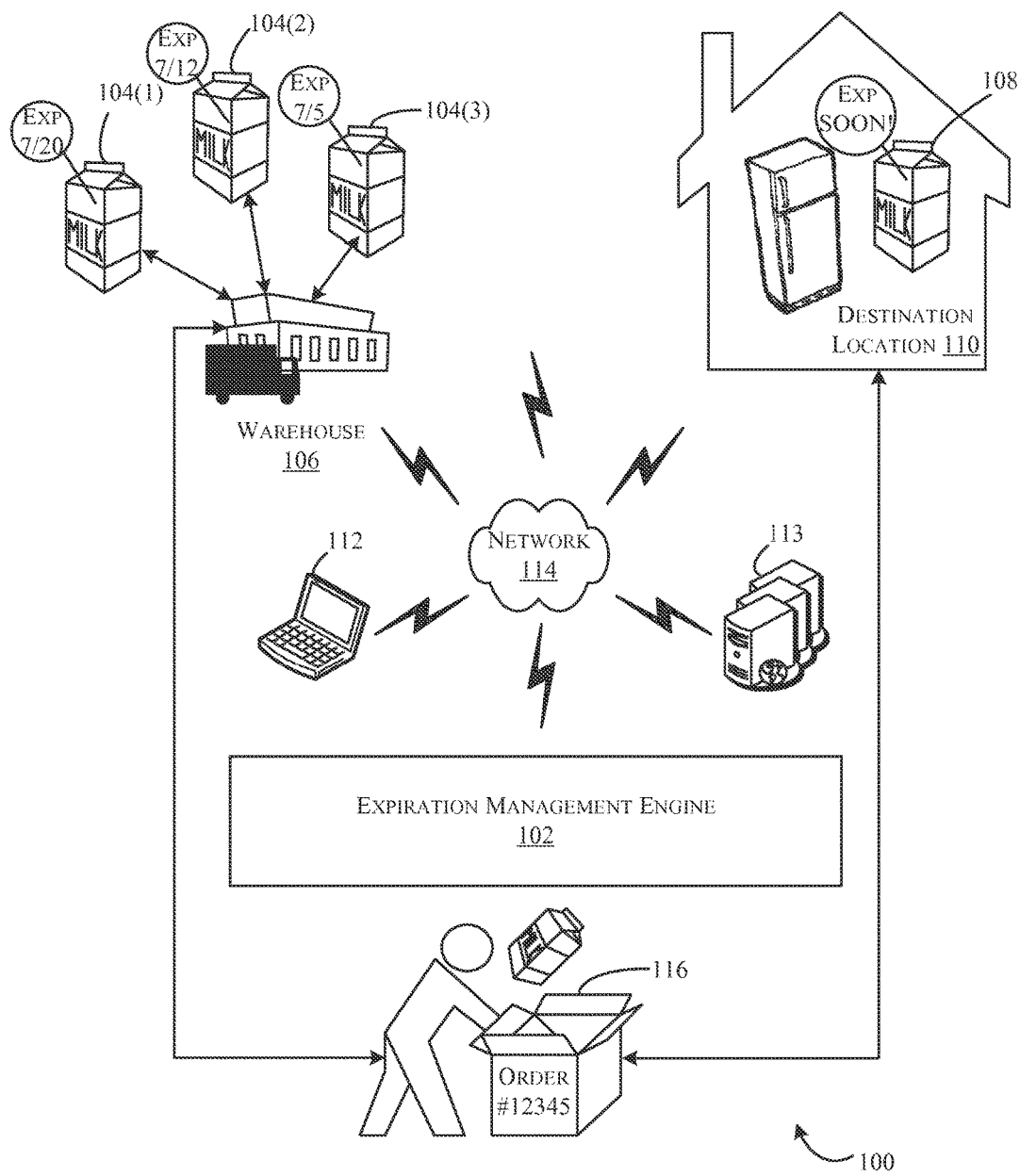
FIG. 1 is a schematic diagram illustrating an example environment for implementing aspects of an expiration management engine, in accordance with at least one embodiment.

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process described may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

Techniques described herein are directed to item expiration date management, utilizing an expiration management engine. Though the term "warehouse" is used, any building or other structure suitable for storing an inventory of goods may be used. In some cases, a storage location may be a bin, a box, a shelf, a geographical or other location-based area (e.g., the west side of a building and/or room), and/or any other suitable location for storing an item. As an overview, an item may be a product, a sellable unit, user-created content (e.g., artwork), or anything else that may be managed or otherwise stored as inventory. Though various products are used in the examples below, it should be appreciated that any item, perishable or non-perishable, may be substituted, including, but not limited to batteries, virtual subscriptions, tangible and intangible goods, and the like. An "expiration date," as used herein, may correspond to a calendar date on which a perishable item becomes unfit and/or non-optimal for use and/or consumption. Alternatively, or in addition, "expiration date" may correspond to, and/or be based at least in part on, a "best before" date, a "use by" date and/or a "freshness" date, for example, as such dates appear on item packaging. A "replenishment date," as used herein, is intended to refer to a specific date, or range of dates, by which a previously-delivered item should be replaced.

In accordance with at least one embodiment, a customer of an electronic marketplace may purchase perishable goods (e.g., batteries, groceries, etc.). The goods may be delivered as the result of a one-time purchase order or the goods may be delivered as part of a subscription service in which, for example, the customer wishes to receive the goods on a periodic basis. As used herein, a "subscription" refers to information that indicates the customer wishes to receive one or more specified items according to a schedule such as a periodic schedule, for a definite, or indefinite, amount of time. As used herein, a "recurring" order refers to an order for same or similar items that has been placed more than once. A subscription may cause a recurring order. In the past, the goods received by the customer might expire prior to the customer being able to use them. In accordance with at least one embodiment of an expiration management engine, expiration dates of these previously-delivered goods may be tracked so that additional goods may be delivered to the customer before the previously-delivered goods expire.

In accordance with at least one embodiment, a person (e.g. an employee) responsible for storing and retrieving various items in a warehouse may scan an item (e.g., a box of cereal) to be stored in the warehouse. Upon receiving information about the cereal, or any suitable time, the expiration management engine may store information regarding the expiration date of the item in a data store suitable for storing such information. In response to receiving a purchase order for cereal, the expiration management engine may determine a particular box of cereal to include in a shipping order based on the expiration dates of the cereal stored at the warehouse. In at least one example, as part of a subscription order, the particular box of cereal may be chosen based on a replenishment date of a previously-delivered item and an expiration date of the particular box of cereal. In at least one example, the particular box of cereal may be chosen based on its expiration date occurring after the replenishment date of the previously-delivered item.

In accordance with at least one embodiment, a customer of an online retailer, for example, may participate in subscription. Some example subscription periodicities may include, but are not limited to, three-month, six-month, nine-month, and one-year subscriptions. As the time for a subscription delivery approaches, the employee may begin preparing a purchase/shipping order resulting from the subscription. In a similar manner as described above, the employee may utilize the expiration management engine to determine a particular item or items to be included in the purchase/shipping order. Alternatively, the expiration management engine may independently determine that the subscription order time is approaching and cause one or more workflows to be initiated for the purposes of fulfilling the subscription with one or more items in accordance with the expiration date(s) of the one or more items and the subscription information. Alternatively, the expiration management engine may independently determine that one or more items of a previous order(s) are nearing their replenishment date(s) and cause one or more workflows to be initiated for the purposes of replenishing the one or more items from the previous order(s).

In accordance with at least one embodiment, a retailer may desire to manage inventory between warehouses based on expiration dates of various items stored in respective warehouses. In one example, the expiration management engine may determine that one or more items at a first warehouse are about to expire. The expiration management engine may also determine that a subscription order is pending that includes items not present, or about to expire, at the first warehouse. Based in this determination, the expiration management engine may determine another warehouse has the same or similar items (e.g., item(s) of the same item type as the one or more items). The expiration management engine may cause initiation of a workflow to enable a transfer of one or more items from the other warehouse to the first warehouse for the purposes of fulfilling the subscription.

In accordance with at least one embodiment, the expiration management engine may determine that a first item at a first warehouse is about to expire in a given time period (e.g., two weeks). The expiration management engine may also determine that another warehouse has an item of the same type that will expire at a later date (e.g., three weeks). The other warehouse may have a subscription already occurring that includes the type of item. In at least one example, the expiration management engine may cause initiation of a workflow to transfer (e.g., ship) the first item from the first warehouse to the other warehouse to increase the likelihood that the item is sold prior to expiration.

In accordance with at least one embodiment, the expiration management engine may receive information regarding a subscription. The subscription may have been initiated by a customer in an electronic marketplace. The subscription may indicate a periodic rate at which the customer desires to be provided a particular item or type of item. In some cases, the customer may initiate a manual purchase order, outside of the subscription, for the particular item. The expiration management engine may receive such information and modify the subscription accordingly. Modifying the subscription may include modifying one or both of an item quantity or periodicity of the subscription.

In accordance with at least one embodiment, the expiration management engine may ship, or otherwise provide, an item to a customer based on a subscription already in progress. The item does not have to be explicitly requested by the customer. In some cases, the customer may return an unwanted item. The expiration management engine may track such return history in order to consider such history in determinations of which item/item type to provide, and when to provide said item/item type to a customer.

In accordance with at least one embodiment, the expiration management engine may optimize a subscription periodicity on behalf of the user (e.g., a customer of an electronic marketplace). In such examples, the expiration management engine may take into account various factors, including, but not limited to, user preference information, manual orders by the user regarding an item subject to a subscription, return history, and user response/lack of response regarding retailer-initiated notifications.

In accordance with at least one embodiment, the expiration management engine may track expiration dates of previously-delivered items (e.g., may maintain a database of "expiration-tracked items"). For example, the expiration management engine may store information indicating a replenishment date and/or an expiration date on which an item will expire. As the replenishment date approaches, the expiration management engine may notify the user (e.g., the customer of the electronic marketplace), among other things, that the item is about to expire and/or the replenishment date approaches. Additionally, or alternatively, the expiration management engine may request confirmation from the user to ship confirmed items to the user, and upon receiving such confirmation, ship the replenishment items to the user. Additionally, or alternatively, the expiration management engine may proactively ship one or more items, with or without sending a notification and/or without requesting or receiving confirmation, to the user upon reaching a threshold amount of time before the replenishment date and/or expiration date of one or more previously-delivered items. The one or more previously-delivered items may have been delivered to the user as the result of a one-time purchase order or a subscription. When a shipment includes multiple replenishment items, the expiration dates of the replenishment items may be selected to form a spread that extends a range of dates over which the replenishment items are due to expire. The spread may be uniform or non-uniform and may be selected based at least in part on a recipient's subscription and/or return history, for example, to optimize the subscription and/or returns with respect to one or more goals including customer satisfaction, number of orders, number of returns, shipping costs, revenue, and/or profitability.

Referring now to the drawings, in which like reference numerals represent like parts, FIG. 1 is a schematic diagram 100 illustrating an example environment for implementing aspects of the expiration management engine 102, in accordance with at least one embodiment. In at least one embodiment, one or more items (e.g., milk carton 104(1)-(3), hereinafter milk cartons 104) may be stored in warehouse 106. Each milk carton of milk cartons 104 may be associated with the same or different expiration dates. For instance, milk carton 104(1) may be associated with an expiration date of July 20. Milk carton 104(2) may be associated with an expiration date of July 12. Milk carton 104(3) may be associated with an expiration date of July 5. Expiration dates may be further associated with a year. For illustration, assume that all expiration dates in the following examples expire during the same year. Similarly, a previously-delivered milk carton 108 may be located at a destination location 110 (e.g., a personal residence). Though a personal residence is used in this example, any destination address, including another warehouse, may be substituted for destination location 110 in any example described herein. Previously-delivered milk carton 108 may be associated with an expiration date that is in the near future. For the purposes of the examples below, assume that expiration dates associated with milk cartons 104 each expire after an expiration date associated with previously-delivered milk carton 108.

In accordance with at least one embodiment, milk cartons 104 may be received at warehouse 106. Upon receipt, or some other suitable time, information associated with milk cartons 104 may be processed at warehouse 106. For instance, milk cartons 104 may be added to the inventory being stored at warehouse 106. For example, an employee at warehouse 106 may enter identification information (e.g., a bar code) located on packaging of milk cartons 104 in order to enter milk cartons 104 into inventory. Any suitable manner of entering item identification information may be employed. Such item identification information may be received by expiration management engine 102. Expiration management engine 102 may cause said item identification information to be stored in memory within the expiration management engine 102 or another suitable storage location. As part of the receiving process, or a separate process, expiration management engine 102 may receive expiration dates associated with milk cartons 104. Such expiration dates may be stored in a similar manner as item identification information described above.

In accordance with at least one embodiment, a one-time order or a subscription order may be placed by a user utilizing a device 112 via network 114. The device 112 may incorporate a mobile phone, a smart phone, a personal digital assistant (PDA), a laptop computer, a desktop computer, a thin-client device, a tablet PC, an electronic book (e-book) reader, or any suitable network-connected computing device. The one-time purchase order or subscription order may be made via a network page provided by a retailer (e.g., a "web page" at a "web site"). A device 113 may be operated by the retailer, or a representative of the retailer, as part of a computing system used to manage inventory in one or more warehouses. In at least one example, the device 113 may be utilized by the retailer to place a one-time purchase order or subscription for the purpose of requesting inventory to be transferred from one warehouse to another. The one-time purchase order or subscription order may be made via software provided by the retailer.

In accordance with at least one embodiment, a subscription may be entered into using device 112 from an electronic marketplace via network 114. The subscription, in this case, may indicate that a user desires to have a carton of milk delivered to destination location 110 once a month. The subscription may specify a start and end date, though an end date is not required. Assume, for the purposes of illustration, that previously-delivered milk carton 108 has been obtained through a subscription initiated purchase order (hereinafter referred to as "subscription order").

In accordance with at least one embodiment, expiration management engine 102 may select a particular item (e.g., milk carton 104(1)) to be included in, for instance, a generated order produced in accordance with the subscription order. In one example, milk carton 104(1) may be selected due to its expiration date occurring later than milk carton 104(2) and milk carton 104(3). In other examples, another milk carton may be selected based on optimizing the distribution of inventory based on the milk cartons' respective expiration dates. The item selection process may be conducted by expiration management engine 102 in accordance with considerations of other orders already placed, predicted future orders, current inventory, expected future inventory, and other considerations as would be apparent to one skilled in the art of inventory management.

In accordance with at least one embodiment, expiration management engine 102, having selected an item for the subscription order (e.g., milk carton 104(1)) may initiate a workflow to have the item delivered (e.g., shipped) to destination location 110. For example, expiration management engine 102 may cause milk carton 104(1) to be packaged at 116 and shipped to destination location 110 in accordance with the subscription order.

In accordance with at least one embodiment, expiration management engine 102 may determine that previously-delivered milk carton 108 is about to expire. This determination may be based on a replenishment date that was calculated by expiration management engine 102. Further, expiration management engine 102 may determine (e.g., by analyzing user purchase history and/or the purchase history of other users) that a user will likely desire an additional purchase/shipping order to be placed, the additional purchase/shipping order being automatically initiated by the expiration management engine 102 independent of user interaction.

In accordance with at least one embodiment, expiration management engine 102 may modify the subscription based on various factors, including, but not limited to, a user-initiated order, a return order, an expiration date of an item previously delivered to the user, and an expiration date of an item currently included in warehouse inventory.

Figure 2:
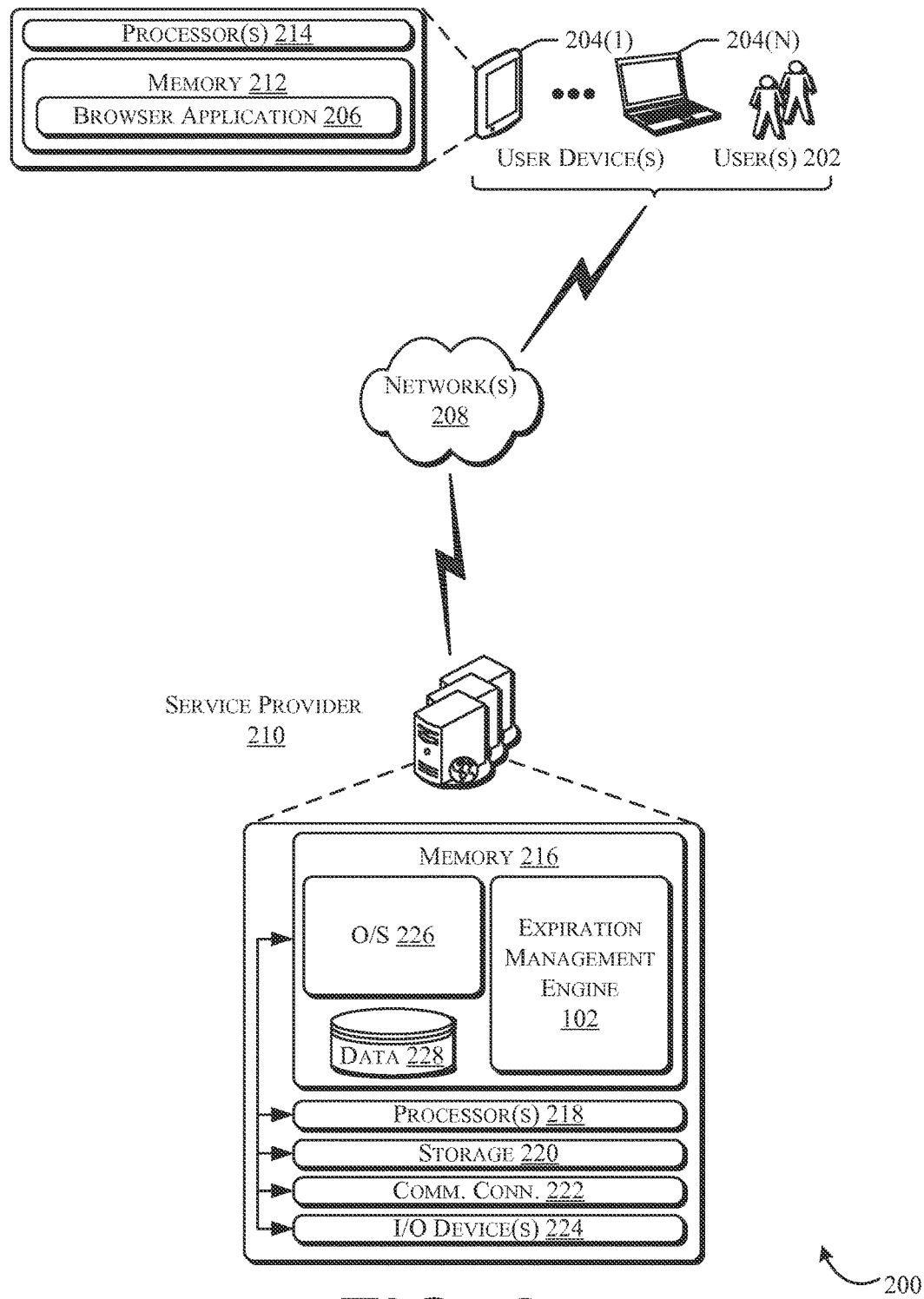
FIG. 2 illustrates an example architecture for providing the expiration management engine, in accordance with at least one embodiment.

FIG. 2 illustrates an example architecture for providing the expiration management engine 102, in accordance with at least one embodiment. In architecture 200, one or more users 202 (i.e., employees of an electronic marketplace provider or warehouse employees) may utilize user computing devices 204(1)-(N) (collectively, user computing devices 204) to access a browser application 206 (e.g., a browsing application capable of receiving scanning input) or a user interface accessible through the browser application 206 via one or more networks 208. In some aspects, the browser application 206 may be hosted, managed, and/or provided by a computing resources service or service provider, such as by utilizing one or more service provider computers 210. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks and other private and/or public networks. While the illustrated example represents the users 202 accessing the browser application 206 over the networks 208, the described techniques may equally apply in instances where the users 202 interact with the service provider computers 210 via the one or more user computing devices 204 over a landline phone, via a kiosk, or in any other manner. It should be appreciated that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with the service provider computers 210 such as to access information associated with items stored within the warehouse. The one or more service provider computers 210, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 202 and serving, in response, various user interfaces that can be rendered at the user computing devices 204. The browser application 206 can provide any type of website that supports user interaction, including search engine sites. As discussed above, the described techniques can similarly be implemented outside of the browser application 206, such as with other applications running on the user computing devices 204.

The user computing devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user computing devices 204 may be in communication with the service provider computers 210 via the networks 208, or via other network connections. Additionally, the user computing devices 204 may be part of the distributed system managed by, controlled by, or otherwise part of the service provider computers 210.

In one illustrative configuration, the user computing devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user computing device, the memory 212 may be volatile (such as random access memory (RAM)) and/or non-volatile (such as read-only memory (ROM), flash memory, etc.). The user computing devices 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including the browser application 206 or dedicated applications (e.g., smart phone applications, tablet applications, etc.). The browser application 206 may be configured to receive, store, and/or display a website or other interface for interacting with the service provider computers 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computers are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 210 may be in communication with the user computing devices 204 and/or other service providers via the networks 208, or via other network connections. The service provider computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 216 may include multiple different types of memory, such as SRAM, DRAM, or ROM.

The memory 216, and the additional storage 220, both removable and non-removable, are examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail, which will be described in further detail in FIG. 3, the memory 216 may include an operating system 226, one or more data stores 228, and/or one or more application programs, modules, or services for implementing the features disclosed herein including expiration management engine 102.

Figure 3:
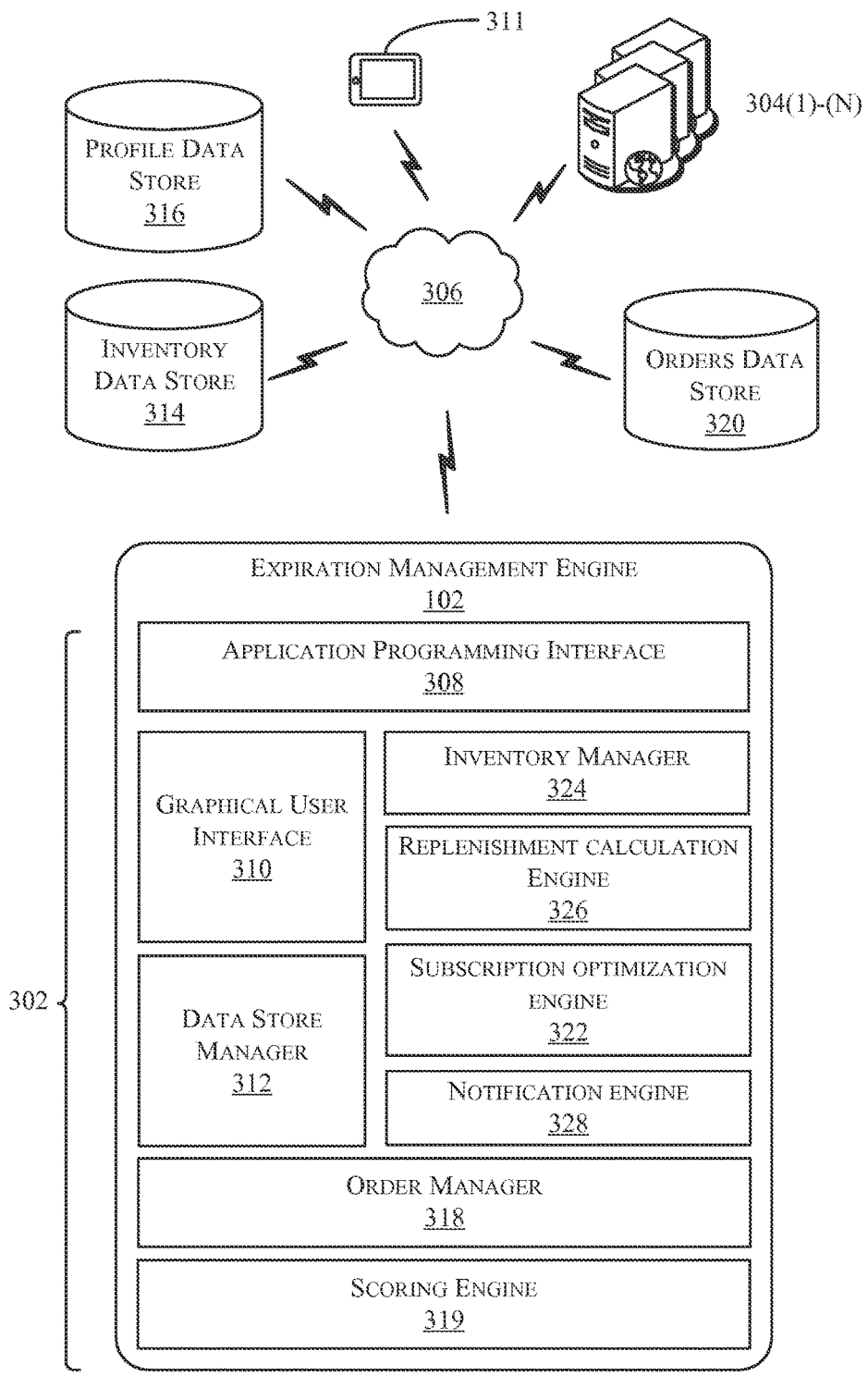
FIG. 3 schematically illustrates an example computer architecture for the expiration management engine including a plurality of modules that may carry out various embodiments.

FIG. 3 schematically illustrates an example computer architecture 300 for the expiration management engine 102 including a plurality of modules 302 that may carry out various embodiments. The modules 302 may be software modules, hardware modules, or a combination thereof. If the modules 302 are software modules, the modules 302 can be embodied on a computer-readable medium and processed by a processor in any of the computer systems described herein. It should be noted that any module or data store described herein, may be, in some embodiments, a service responsible for managing data of the type required to make corresponding calculations. The modules 302 may be configured in the manner suggested in FIG. 3 or may exist as separate modules or services external to the expiration management engine 102.

In the embodiment shown in the drawings, an inventory data store 314, a profile data store 316, and an orders data store 320 are shown, although data can be maintained, derived, or otherwise accessed from various data stores, either remotely or locally, to achieve the functions described herein. The expiration management engine 102, shown in FIG. 3, includes various modules such as a graphical user interface 310, an application programming interface 308, a data store manager 312, an order manager 318, a scoring engine 319, an inventory manager 324, a replenishment calculation engine 326, a subscription optimization engine 322 and a notification engine 328. Some functions of the modules 308, 310, 312, 318, 319, 322, 324, 326, and 328 are described below. However, for the benefit of the reader, a brief, non-limiting description of each of the modules is provided in the following paragraphs.

In accordance with at least one embodiment, a process is enabled for managing the sale and distribution of items offered by a retailer based at least in part on an expiration date of an item. For example, a user may utilize one or more of service provider devices 304(1-N) (e.g., the service provider computers 210) to receive one or more items at a warehouse. Service provider devices 304(1-N) may be configured to communicate with a network 306. As part of a receiving process, item identification information and/or expiration date information for an item may be received by expiration management engine 102 via application programming interface 308 and graphical user interface 310, both components of expiration management engine 102. It should be appreciated that the network 306 may be the same or similar as the networks 208 described in connection with FIG. 2. Application programming interface 308 and/or graphical user interface 310 may be utilized in any example described herein as a means for receiving information by expiration management engine 102.

In accordance with at least one embodiment, a user (e.g., a customer) of an electronic marketplace provided by the retailer may utilize user device 311 (e.g., user computing devices 204) to initiate a one-time purchase order for an item offered for consumption on an electronic marketplace. Similarly, user device 311 may be utilized to enter into a subscription for one or more items offered for consumption on the electronic marketplace. User device 311 may further be utilized to enable the user to provide user profile information and/or subscription preferences. User profile information may include, but is not limited to, address information, billing information, username, and password information. A subscription preference may include, but is not limited to, a type of item, a number of items, a frequency of orders, and an indication as to whether the user desires to allow the electronic marketplace provider the authority to initiate purchase and/or shipping orders on the user's behalf, independent of user interaction.

In accordance with at least one embodiment, data store manager 312, a component of expiration management engine 102, may be configured to cause item identification information and/or expiration date information associated with an item to be stored in inventory data store 314. Data store manager 312 can be configured to cause user profile data and/or subscription preferences to be stored in profile data store 316. Data store manager 312 can be configured to retrieve order history information from orders data store 320. In general, data store manager 312 may manage any storage of data between expiration management engine 102, inventory data store 314, profile data store 316, orders data store 320, and/or any suitable storage location utilized by expiration management engine 102.

In accordance with at least one embodiment, order manager 318, a component of expiration management engine 102, may be configured to receive purchase orders and create and manage shipping orders received by expiration management engine 102. Purchase orders may be received via an electronic marketplace as described above, and may include a one-time purchase order and/or a subscription order. Order manager 318 may utilize the replenishment calculation engine 326 to perform analysis and/or calculations with respect to expiration and/or replenishment dates. Order manager 318 may utilize the scoring engine 319 to score one or more items as part of the process of selecting the particular item. Order manager 318 may be configured to select a particular item in inventory to fulfill an order based on, for instance, a particular item score calculated by the scoring engine 319. Order manager 318 can exchange information with one or more components of the expiration management engine 102. For instance, order manager 318 may be configured to cause data store manager 312 to store order information in orders data store 320. In at least one example, order manager 318 can generate one or more purchase/shipping orders in accordance with a received one-time purchase order or a received subscription order.

In accordance with at least one embodiment, scoring engine 319, a component of expiration management engine 102, may be configured to score one or more items in inventory based on a number of factors, including but not limited to one or more expiration dates of one or more items in inventory, a determination of relevancy with respect to a first item being scored and a second item being ordered, a subscription periodicity, and an expiration date of a previously-delivered item. Scoring engine 319 may be configured to interact any other component of expiration management engine 102.

In accordance with at least one embodiment, subscription optimization engine 322, a component of expiration management engine 102, may be configured to receive subscription information regarding one or more users of an electronic marketplace (e.g., customers of the electronic marketplace provider). Subscription optimization engine 322 can analyze order information from orders stored in orders data store 320 in order to ascertain trends derived from all orders, or a subset of all orders, occurring in the electronic marketplace. Additionally, or alternatively, subscription optimization engine 322 may be configured to analyze past purchase history and/or past return history of one or more users of the electronic marketplace. Subscription optimization engine 322 can modify subscriptions of one or more users in accordance with the analyses described above. Such modifications may include, but are not limited to, changes in item quantity, item unit volume/size, or periodicity of subscription orders. In at least one example, subscription optimization engine 322 can obtain user preference information stored in profile data store 316. Such user preference information may be utilized by subscription optimization engine 322 for the purposes of determining whether one or more changes are to be made to one or more subscriptions.

In accordance with at least one embodiment, inventory manager 324, a component of expiration management engine 102, may be configured to analyze information from inventory data store 314. For instance, inventory manager 324 may monitor, or, otherwise, obtain expiration date information for items currently stored in one or more warehouses. Upon analyzing such information, inventory manager 324 may be configured to cause order manager 318 to process one or more shipping orders that will result in a transfer of one or more items from a first warehouse to one or more other warehouses.

In accordance with at least one embodiment, replenishment calculation engine 326, a component of expiration management engine 102, may be configured to analyze expiration dates associated with past purchases of one or more users of the electronic marketplace. Additionally, or alternatively, the replenishment calculation engine 326 may be configured to analyze expiration dates of one or more items currently stored in one or more respective warehouses. Further, replenishment calculation engine 326 may be configured to calculate one or more replenishment date associated with one or more particular items. In at least one example, upon reaching the replenishment date, replenishment calculation engine 326 may be configured to initiate one or more workflows executed by subscription optimization engine 322, order manager 318, or notification engine 328, discussed below.

In accordance with at least one embodiment, notification engine 328, a component of expiration management engine 102, may be configured to cause one or more notifications to be transmitted to one or more users. Such notifications may include an email message, text message, phone call, or other suitable form of communication. Notification engine 328 can receive response information from one or more users of the electronic marketplace. Upon receipt of such response information, notification engine 328 may be configured to initiate one or more workflows with one or more components of expiration management engine 102. Notification engine 328 may further be configured to cause the storage of response information in profile data store 316.

Figure 4:
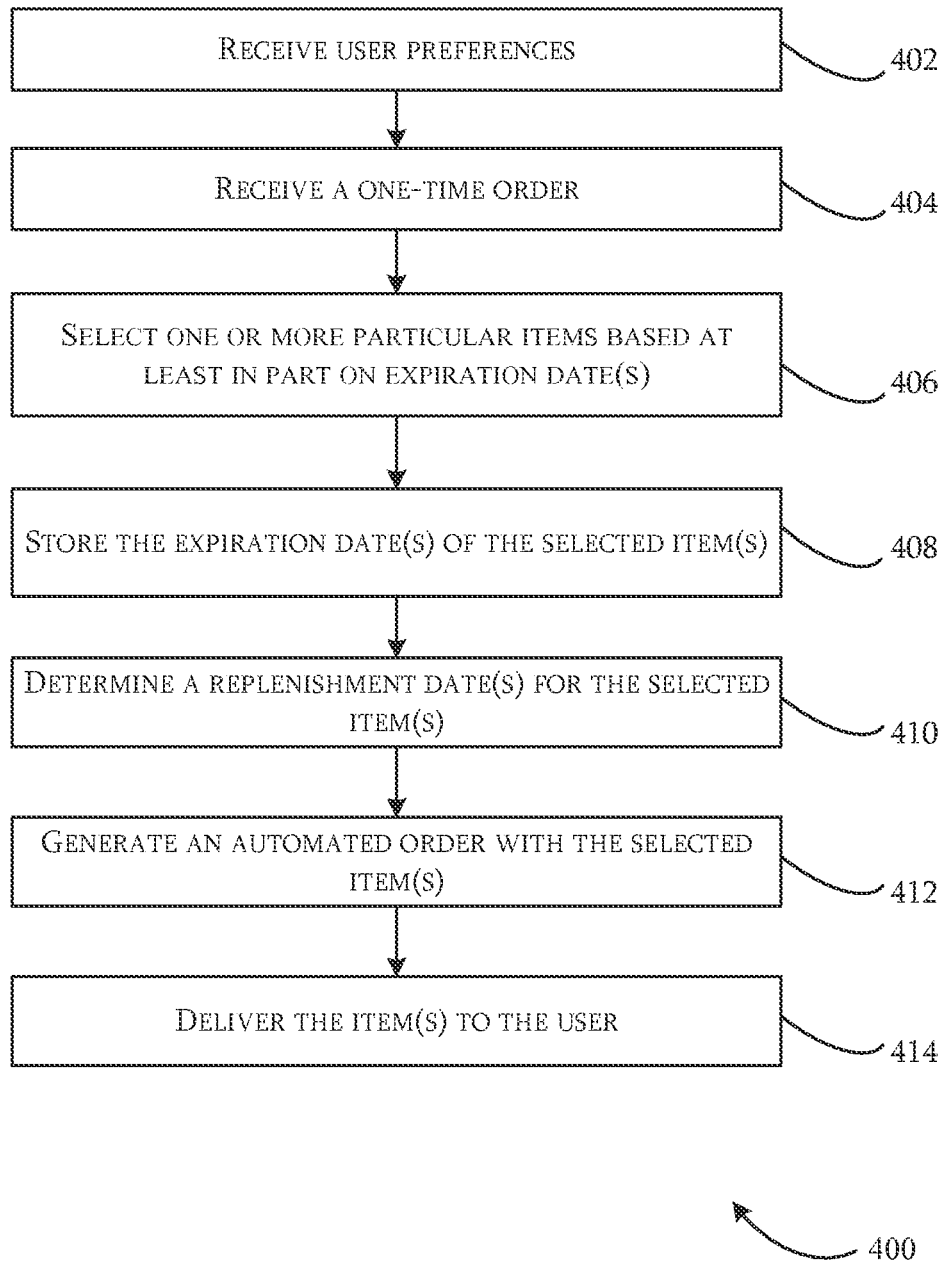
FIG. 4 is a flowchart illustrating a method for managing orders based on expiration date, in accordance with at least one embodiment.

FIG. 4 is a flowchart illustrating a flow 400 for utilizing an expiration management engine (e.g., the expiration management engine 102), in accordance with at least one embodiment. Some or all of the flow 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The code may be, for example, the modules described herein. The computer-readable storage medium may be non-transitory.

The flow 400 may begin at block 402, where user preferences are received. User preferences may be received from a user device such as user device(s) 204. User preference information may be obtained via an electronic marketplace as part of a registration process of the user. User preference information may include, but is not limited to, an indication as to whether the user desires to provide the retailer authority to initiate new purchase and/or shipping orders independent of user interaction. User preference information may additionally, or alternatively, include an indication as to whether the user wishes the retailer to optimize the user's subscriptions based on expiration date, past purchase history, and/or return history. Such user preference data may be stored in any suitable location, for example, profile data store 316.

At block 404, a one-time order may be received by a component of the expiration management engine 102, for example, order manager 318. The one-time order may be a purchase order that identifies an item and a quantity for an item. The one-time order may be initiated by a user or on a user's behalf. As an illustrative example, the one-time order may identify 3 boxes of brand XYZ cereal.

At block 406, a particular item, or items, may be selected based at least in part on the expiration date(s) of the item(s). As part of a process for selecting a particular item based at least in part on expiration date(s), the order manager 318, for example, may analyze information regarding one or more items of a same item type as the item included in the one-time order. For example, order manager 318 may determine that there are one or more boxes of XYZ cereal available. In at least one example, order manager 318 may determine an expiration date for each box of brand XYZ cereal in inventory. Alternatively, order manager 318 may determine an expiration date for a subset of inventory. If multiple boxes of XYZ cereal are available, one or more boxes of XYZ cereal may be scored by, for example, scoring engine 319 based on a number of factors, including, but not limited to, a date of expiration for the particular box of XYZ cereal, expiration dates of other boxes of XYZ cereal in inventory, expiration dates of other related boxes of cereal, a determination of relevancy with respect to the item being scored and the item being ordered, a subscription order periodicity, or an expiration date of a previously-delivered item. In at least one example, a highest scored item, or items, may be selected to fulfill the one-time purchase order.

In another illustrative example, the scoring engine 318, or another component of expiration management engine 102, may analyze information regarding an expiration date(s) of one or more items having been previously-delivered to the user. Scoring engine 319 may score an item, or items, in inventory having expiration date(s) that occur later than an expiration or replenishment date of a previously-delivered item associated with the subscription higher than an item in inventory having an expiration date that occurs closer to the expiration or replenishment date of the previously-delivered item.

In still one further illustrative example, order manager 318 may determine that there are no boxes of brand XYZ cereal available and/or that fulfilling the one-time purchase order with a different brand of cereal may be advantageous for the customer, based on, for example, a determination that the different brand of cereal is offered at a lower cost. In such a case, order manager 318 may determine a related item, having a similar item type (e.g., brand QRS cereal) as the item included in the one-time purchase order. For instance, a related item may be determined utilizing a category tree in which a related item may be selected as a result of having the same category in the tree as the item. Alternatively, a relevance score may be calculated by, for example, scoring engine 319, utilizing browsing history from one or more users of the electronic marketplace. For instance, if users view the item and another item within a particular time frame, the relevance score may reflect such a correlation. For example, the relevance score of such items may be higher than scores of other items that are not viewed within a particular time period of a user viewing the item.

In accordance with at least one embodiment, order manager 318 may select a particular item to be utilized in fulfilling the one-time purchase order based on the scores calculated by scoring engine 319.

At block 408, the expiration date(s) for the selected item(s) may be stored. In at least one example, order manager 318 may cause the expiration date(s) to be stored within inventory data store 314. Additionally, or alternatively, the order manager 318 may cause the expiration date(s) to be stored in either profile data store 316 and/or orders data store 320.

At block 410, one or more replenishment dates may be determined for the selected item by a component of the expiration management engine 102 (e.g., the replenishment calculation engine 326 of FIG. 3). The replenishment date(s) may be calculated based on the expiration date of the item. In an illustrative example, the replenishment date(s) may be calculated to be two weeks prior to the expiration date. The replenishment date(s) may be calculated based on a number of factors, including, but not limited, user preference, an expiration date of a previously-delivered item, and an approximate delivery time for a replacement item. The replenishment date(s) may be stored in expiration management engine 102, inventory data store 314, or any suitable storage location.

At block 412, an automated order may be generated. The generated order may include, in this example, a shipping order identifying at least the particular item(s) and a destination and/or a purchase order identifying the particular item(s). These orders may be generated by order manager 318 or another component of expiration management engine 102. For example, the shipping order may be generated with a shipping date such that the particular item(s) arrive at the destination on or before the determined replenishment date.

At block 414, the item(s) may be delivered to the user. Delivery may include a transfer of physical or electronic possession.

Figure 5:
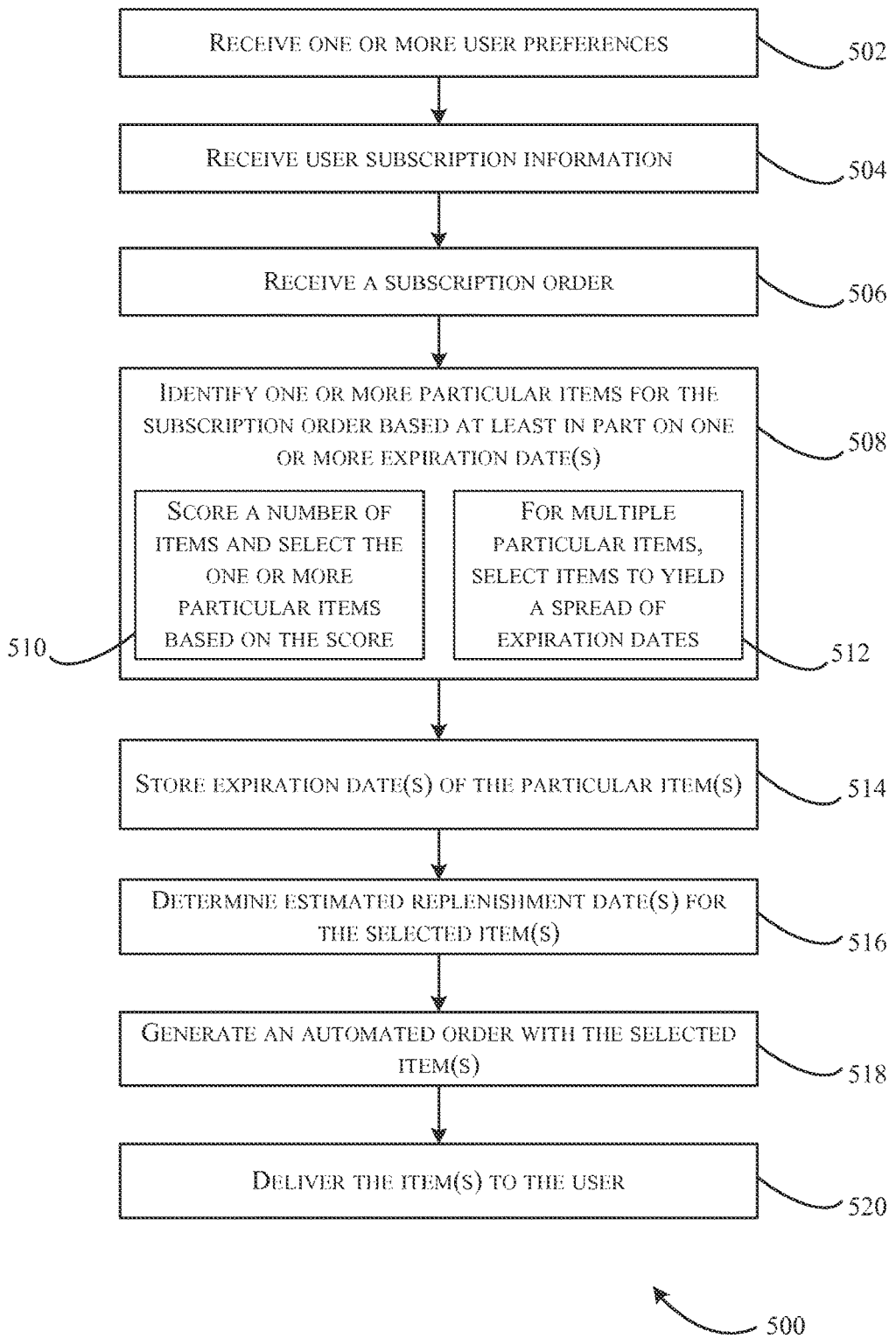
FIG. 5 is a flowchart illustrating a method for managing orders based on expiration date, in accordance with at least one further embodiment.

FIG. 5 is a flowchart illustrating a method 500 for utilizing an expiration management engine (e.g., the expiration management engine 102), in accordance with at least one further embodiment. The flow 500 may begin at block 502, where one or more user preferences are received. User preferences may be received from a user device such as user device(s) 204. User preference information may be obtained via an electronic marketplace as part of a registration process of the user or some other suitable process. User preference information may include, but is not limited to, an indication as to whether the user desires to provide the retailer authority to initiate new purchase/shipping orders, independent of user interaction. User preference information may additionally, or alternatively, include an indication as to whether the user wishes a retailer to optimize the user's subscriptions based on various factors, including, but not limited to, expiration date, past purchase history, and return order history. Such user preference data may be stored in any suitable location, for example, profile data store 316.

At block 504, user subscription information may be received. The subscription information may indicate data associated with a subscription (e.g., that a user desires to receive an item at a periodic rate for a particular amount of time). In one illustrative example, the user may desire to receive one gallon of "Nature's Happy Cow 2% milk," once a month, for a year. The subscription may include additional items. One or more individual items may be associated with the same or different period rates. For example, a user may wish to obtain a dozen eggs and a gallon of milk once a month, and a bottle of shampoo every other month.

At block 506, a subscription order may be received by a component of the expiration management engine 102, for example, order manager 318. The subscription order may indicate a particular order associated with a subscription. For example, the subscription order may identify that the user should be shipped a gallon of milk, a dozen eggs, and a bottle of shampoo by a particular date. The subscription order may be the sole order in the subscription or one in a series of subscription orders that will be processed.

At block 508, a component of expiration management engine 102, for example, order manager 318, may identify a particular item (e.g., in the warehouse 106 inventory) for the subscription order based at least in part on one or more expiration dates of item(s) (e.g., in the warehouse 106 inventory).

As part of a process for identifying the particular item(s) based on expiration date(s), the order manager 318, for example, may utilize scoring engine 319 to score a number of items and enable orders manager 318 to select the particular item based on the score at block 510. For example, order manager 318 may determine that there are multiple boxes of brand XYZ cereal available. In at least one example, order manager 318 may determine an expiration date for each box of brand XYZ cereal in inventory. Alternatively, order manager 318 may determine an expiration date for a subset of inventory. If multiple boxes of brand XYZ cereal are available, one or more boxes of brand XYZ cereal may be scored by, for example, scoring engine 319, in a similar manner as described above in connection with FIG. 4.

In another illustrative example process for identifying a particular item based on expiration date, the scoring engine 319, for example, may analyze information regarding one or more expiration dates of an one or more items that were previously-delivered to the user. For example, scoring engine 319 may score an item, or items, in inventory having expiration date(s) that occur later than an expiration or replenishment date of one or more previously-delivered items associated with the subscription higher than an item in inventory having an expiration date that occurs closer to the expiration or replenishment date of the previously-delivered item(s).

In still one further illustrative example, order manager 318 may determine that there are no boxes of brand XYZ cereal available. Additionally, or alternatively, order manager 318 may determine that fulfilling the subscription order with another brand of cereal rather than brand XYZ may be advantageous for the customer. Such a determination may be based on identifying that a particular box of the other brand of cereal has an expiration date that is more suitable to fulfilling the subscription order than the expiration dates of boxes of brand XYZ cereal (e.g., the other box of cereal has an expiration date that occurs later than that of the boxes of brand XYZ cereal). In such a case, scoring engine 319 may score items of the same or different types in order to enable orders manager 318 to select one or more particular items based on the scores.

As part of a process for identifying a particular item based on expiration date, the order manager 318, for example, may select multiple items having different expiration dates at block 512 to yield a spread of expiration dates. In at least one illustrative example, when a shipment includes multiple replenishment items, the expiration dates of the replenishment items may be selected to form a spread that extends a range of dates over which the replenishment items are due to expire. The spread may be uniform or non-uniform and may be selected based at least in part on a recipient's order and/or return history, for example, to optimize orders and/or returns with respect to one or more goals including customer satisfaction, number of orders, number of returns, shipping costs, revenue and/or profitability. In at least one example, order manager 318, upon receiving an order for four gallons of milk. Order manager 318 may determine that the four particular gallons of milk to be used to fulfill the subscription order will have varying expiration dates. For instance, a first gallon may be selected that expires in one week, the second gallon selected may expire in two weeks, etc. such that expiration dates of items included in the order are staggered in time and/or throughout the subscription period. Scoring engine 319 may be utilized to score the multiple items to achieve the spread of varying expiration dates.

At block 514, the expiration date(s) of the selected item(s) may be stored. In at least one example, order manager 318 may cause the expiration date(s) to be stored within inventory data store 314. Additionally, or alternatively, the order manager 318 may cause the expiration date(s) to be stored in either profile data store 316, orders data store 320, or another suitable location.

At block 516, the replenishment date(s) may be determined for the selected item(s) by a component of the expiration management engine 102 (e.g., the replenishment calculation engine 326 of FIG. 3). The replenishment date(s) may be calculated based on the expiration date(s) of the item(s). In an illustrative example, the replenishment date(s) may be calculated to be two weeks prior to the expiration date(s). The replenishment date(s) may be calculated based on a number of factors, including, but not limited, user preference, an expiration date of a previously-delivered item, and an approximate delivery time for a replacement item. The replenishment date(s) may be stored in expiration management engine 102, inventory data store 314, or any suitable storage location.

At block 518, an automated order may be generated. The generated order may include, in this example, a shipping order identifying at least the particular item(s) and a destination and/or a purchase order that identifies at least the particular item(s). The order(s) may be generated by order manager 318 or another component of expiration management engine 102. For example, the shipping order may be generated with a shipping date such that the particular item(s) arrive at the destination on or before the determined replenishment date(s).

At block 520, the item(s) may be delivered to the user. Delivery may include a transfer of physical or electronic possession.

Figure 6:
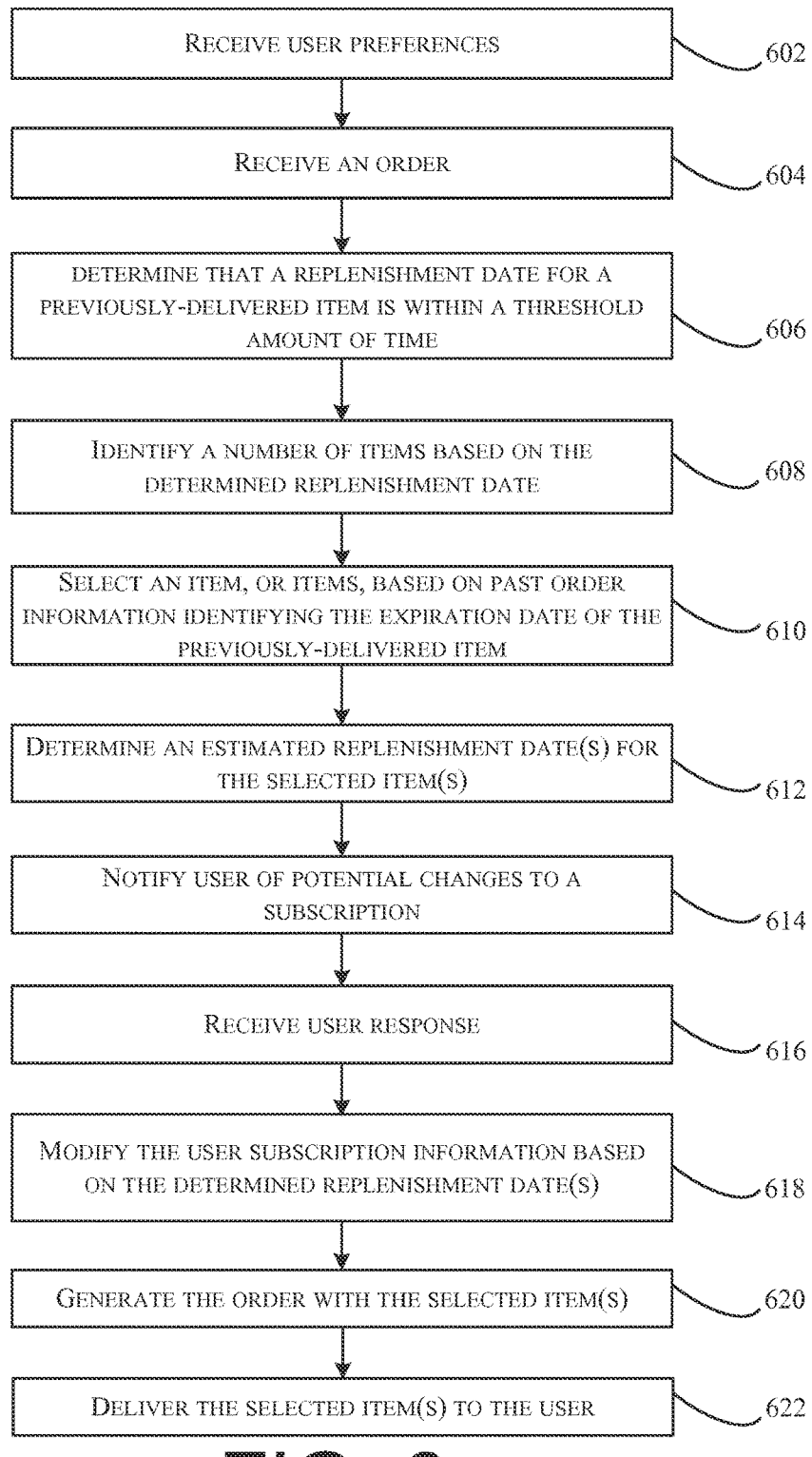
FIG. 6 is a flowchart illustrating a method for managing orders based on expiration date, in accordance with still one further embodiment.

FIG. 6 is a flowchart illustrating a flow 600 for utilizing an expiration management engine (e.g., the expiration management engine 102), in accordance with at least one still further embodiment. The flow 600 may begin at block 602, where user preferences are received. User preferences may be received from a user device such as user device(s) 204. User preference information may be obtained via an electronic marketplace as part of a registration process of the user. User preference information may include, but is not limited to, an indication as to whether the user desires to provide the retailer authority to initiate new purchase/shipping orders, independent of user interaction. User preference information may additionally, or alternatively, include an indication as to whether the user wishes the retailer to optimize the user's subscription based on expiration date, past purchase history, and/or return order history. Such user preference data may be stored in any suitable location, for example, profile data store 316.

At block 604, a purchase order may be received by order manager 318 in a similar manner as described above. The order may be a one-time purchase order or an order initiated as the result of a subscription (hereinafter referred to as a "subscription order"). At block 606, a determination may be made that a replenishment date for a previously-delivered item is occurring within a threshold amount of time. In at least one example, replenishment calculation engine 326 may interact with orders data store 320 in order to ascertain whether a replenishment date of a previously-delivered item is occurring within a threshold amount of time.

At block 608, a number of items (e.g., replacement items) may be identified by, for example, order manager 318 based on, for example, item identification information included in the subscription order, expiration dates, associated with the item(s), and/or the determined replenishment date(s) of the previously-delivered item(s). For example, on or near the replenishment date(s), the order manager 318 may utilize similar processes as described above in connection with FIGS. 4 and 5 to identify one or more items from which one or more replenishment items can be selected. At block 610, an item(s) may be selected based on past order information, the past order information identifying the expiration date of the previously-delivered item(s). Past order information may be obtained by order manager 318 from orders data store 320. Similar processes of scoring a number of items described above in connection with FIGS. 4 and 5 may be utilized to score the number of items such that one or more highest scored items may be selected.

At block 612, an estimated replenishment date for the selected item may be determined, for example, by replenishment calculation engine 326. Replenishment calculation engine 326 may interact with orders data store 320 in order to obtain information about past orders of the user and past orders of other users of the electronic marketplace. The replenishment calculation engine 326 may determine whether to initiate one or more workflows associated with replenishing the item(s). The one or more workflows need not occur on the exact replenishment date(s), but may be based at least in part on the replenishment date(s). The replenishment calculation engine 326 may determine (e.g., by analyzing past purchase history, user preferences, global user purchase history, return order history, etc.) that a user will likely desire an additional purchase and/or shipping order to be placed, the additional purchase/shipping order being automatically initiated by the expiration management engine 102 independent of user interaction. For example, past orders of the user may be used to determine an amount of time that elapses between user orders for the same item. The past order information may indicate, for example, that a user typically orders bread approximately every four weeks. Past order information of other users of the electronic marketplace may be used to determine, for instance, an average rate at which other users order bread. For example, other users of the electronic marketplace may typically order bread every two weeks. Consider the case where the user has never ordered bread, or rarely orders bread. In this case, past order information of other users of the electronic marketplace may be used to set a replenishment date at two weeks from the order date for a loaf of bread ordered by the user. Similarly, as another example, the information indicating that a user typically orders bread approximately every week may be used to set a replenishment date at one week from the order date for a loaf of bread ordered by the user.

At block 614, the user may be notified of potential changes to a subscription. A component of the expiration management engine 102, for example, notification engine 328, may be utilized to manage such notifications. The notification engine 328 may cause an electronic message, text message, or some other suitable form of communication to be sent to a user indicating, for instance, that a subscription periodicity will be changed. The notification may provide suggestions to the user to modify a subscription. If the order is a one-time purchase order, than the notification may provide suggestions to the user to set up or modify a subscription. In either example, the provided suggestions may be based on a number of factors, including, but not limited to, the user's past orders, other users' orders, other intervening one-time orders, purchase history, and/or return history.

At block 616, a user response to the notification from block 614 may be received. The user may respond by either confirming or rejecting the indicated change at block 618. The notification engine 328 may utilize any user response in order to determine whether an appropriate workflow should be initiated to make one or more changes to a subscription. In some cases, a lack of response may constitute acquiescence to an automatically generated order. The notification and type of response required or, alternatively, not required, may be further based on the user preferences determined at block 602.

At block 618, user subscription information may be modified and/or updated based on the determined replenishment date(s). Additionally, or alternatively, user subscription information may be modified and/or updated based on the user preferences and/or expiration date(s) of a previously-delivered item(s). A component of the expiration management engine 102, for example, subscription optimization engine 322, may be notified by replenishment calculation engine 326 that a subscription modification is desirable. Based on replenishment date information obtained from replenishment calculation engine 326, or some other component of expiration management engine 102, subscription optimization engine 322 may cause information related to a subscription to be altered.

For example, consider the case where a user is associated with a subscription order indicating that a gallon of milk is to be provided to the user once a month. Replenishment calculation engine 326 may calculate a replenishment date given the particular user's past order information and/or global user behavioral data, as described above. In at least one example, subscription optimization engine 322 may determine that a one-time purchase order for the same or similar item was manually initiated by the user two weeks into the subscription period. Subscription optimization engine 322 may determine that the one-time purchase order occurs prior to the previously calculated replenishment date. Accordingly, subscription optimization engine 322 may determine that the user requires a gallon of milk on a more frequent basis than the user originally indicated in the subscription. In this case, the subscription optimization engine 322 may modify the subscription to occur every two weeks, or at least more frequently than originally requested. In at least one example, user preference or the received notification response may indicate confirmation or rejection by the user to allow changes to a subscription. Changes to the subscription may be made in accordance with such indication.

At block 620, an automated order may be generated with the selected item. The generated order may include, in this example, a shipping order identifying at least, the particular item(s), and a destination and/or a purchase order identifying the particular item(s). These orders may be generated by order manager 318 or another component of expiration management engine 102. For example, the shipping order may be generated with a shipping date such that the particular item(s) arrive at the destination on or before the determined replenishment date(s).

At block 622, the item(s) may be delivered to the user. Delivery may include a transfer of physical or electronic possession.

Figure 7:
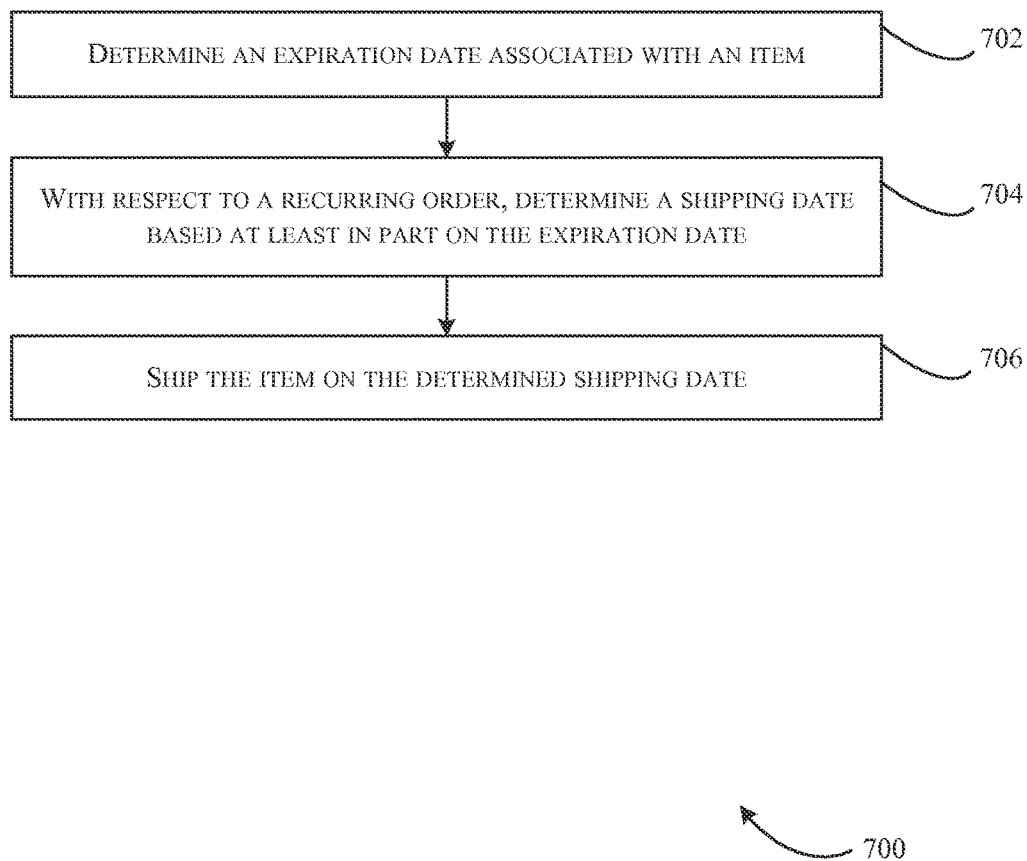
FIG. 7 is a flowchart illustrating a method for managing orders based on expiration date, in accordance with another embodiment.

FIG. 7 is a flowchart illustrating a method 700 for utilizing an expiration management engine (e.g., the expiration management engine 102), in accordance with at least one other embodiment. The flow may begin at block 702, where an expiration date associated with an item in inventory may be determined. A component of the expiration management engine 102, for example, the order manager 318, may determine an expiration date of the item as part of the item selection process.

At block 704, a shipping date may be determined based at least in part on the expiration date, the shipping date being in reference to a recurring order. The shipping date may be decided by a component of the expiration management engine 102, for example, the subscription optimization engine 322. In at least one example, subscription optimization engine 322 may analyze a replenishment date determined by replenishment calculation engine 326 in order to determine the shipping date for the recurring order as part of a process for optimizing a subscription order.

In accordance with at least one example, inventory manager 324 may be utilized in determining a shipping date based at least in part on the expiration date of an item. For example, suppose there are two warehouses, each storing the same brand of milk. Inventory manager 324 may determine that warehouse one has milk that will expire prior to fulfillment of a recurring order. Inventory manager 324 may determine a shipping date for the milk at warehouse two. The determined shipping date may be utilized to transfer milk from warehouse two, the milk having a later expiration date than milk at warehouse one, to warehouse one for the purposes of fulfilling the recurring order, since the milk that is currently at warehouse one will expire and thus not be usable for fulfilling the recurring order.

In accordance with at least one embodiment, inventory manager 324 may be further utilized in determining a shipping date based at least in part on the expiration date of an item. Continuing with the two-warehouse example, inventory manager 324 may determine that warehouse one has milk that will expire in two weeks, while warehouse two has milk that will expire in three weeks. Suppose that warehouse two is associated with a recurring order that includes the milk, whereas warehouse one is not associated with any recurring orders that include the same milk. Inventory manager 324 may determine a shipping date for the milk at warehouse one. The determined shipping date may be utilized to transfer milk from warehouse one, the milk having an earlier expiration date than milk at warehouse two, to warehouse two for the purposes of distributing the milk having the earlier expiration date prior to its expiration. At block 706, the item may be shipped on the determined shipping date.

Figure 8:
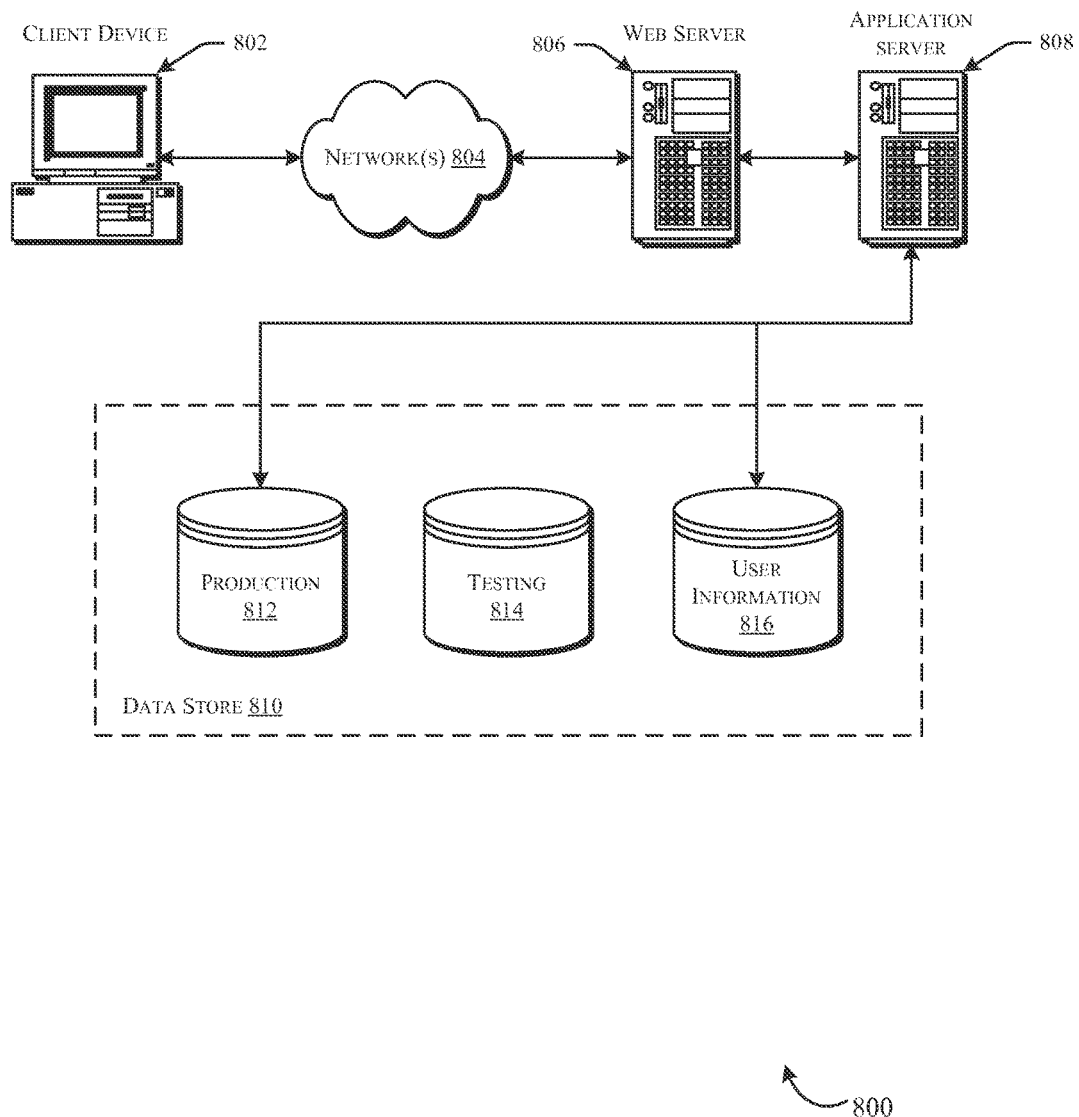
FIG. 8 is a schematic diagram illustrating an example environment for implementing aspects in accordance with at least one embodiment of the expiration management engine described herein.

FIG. 8 is a schematic diagram illustrating an example environment 800 for implementing aspects in accordance with at least one embodiment of the optimized path calculation service described herein. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of Hyper Text Markup Language ("HTML"), Extensible Markup Language ("XML"), JavaScript Object Notation ("JSON") or another appropriate structured language in this example. The handling of all requests and responses, as well as the delivery of content between the electronic client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, user subscription information identifying one or more items offered in an electronic marketplace, the one or more items to be provided to a user at a periodic rate according to the user subscription information;
   identifying a plurality of perishable items based at least in part on the user subscription information;
   identifying a first plurality of expiration dates for the plurality of perishable items;
   obtaining past order history of a plurality of users including the user, the past order history indicating a plurality of previously-delivered items provided to respective users of the plurality of users at a respective recurring frequency;
   determining a particular perishable item of the plurality of perishable items to include in an automated order based at least in part on the first plurality of expiration dates of the plurality of perishable items and a second plurality of expiration dates of the plurality of previously-delivered items, wherein the particular perishable item is determined based at least in part on optimizing a plurality of orders comprising the plurality of perishable items;
   determining an estimated replenishment date for the particular perishable item based at least in part on an expiration date associated with the particular perishable item;
   determining that the user has initiated a manual order for the one or more items;
   modifying the periodic rate of the user subscription information based at least in part on the estimated replenishment date and the determination that the user has initiated the manual order, wherein modifying the user subscription information is independent of user action and reduces a likelihood of the user initiating an additional manual order for the one or more items thereby reducing network traffic at the electronic marketplace; and
   generating, by the computer system, the automated order based at least in part on the modified user subscription information.

2. The computer-implemented method of claim 1, wherein modifying the user subscription information changes the periodic rate.

3. The computer-implemented method of claim 1, wherein the automated order includes an additional perishable item of a same type as the particular perishable item, the additional perishable item having a different expiration date from the expiration date associated with the particular perishable item.

4. The computer-implemented method of claim 1, wherein determining the particular perishable item comprises:
   scoring the plurality of perishable items based at least in part on the first plurality of expiration dates;
   optimizing a selection of the plurality of perishable items for the plurality of orders based at least in part on the scoring; and
   selecting the perishable item of the scored plurality of perishable items based at least in part on the optimized selection.

5. The computer-implemented method of claim 1, wherein modifying the user subscription information includes at least one of updating a quantity of the perishable item or updating a delivery frequency of the perishable item.

6. The computer-implemented method of claim 1, further comprising:
   providing a notification to the user based at least in part on modifying the user subscription information.

7. A system, comprising:
   a processor; and
   a memory storing computer-executable instructions that, when executed with the processor, cause the system to at least:
      receive user subscription information identifying one or more items offered in an electronic marketplace, the one or more items to be provided to a plurality of users at periodic rates according to the user subscription information;
      identify a plurality of perishable items based at least in part on the user subscription information;

identify a first plurality of expiration dates for the plurality of perishable items;

obtain past order history of the plurality of users of an electronic marketplace, the past order history indicating a plurality of previously-delivered items associated with respective users of the plurality of users;

select particular items from a plurality of items having an item type corresponding to the previously-delivered items, the particular items being selected based at least in part on respective expiration dates associated with the particular items and respective replenishment dates associated with the previously-delivered items, the particular items being selected based at least in part on an optimization of a plurality of orders of the plurality of users with respect to the respective expiration dates associated with the particular items;

determine estimated replenishment dates for the particular items based at least in part on the respective expiration dates associated with the particular items;

determine that the user has initiated a manual order for the one or more items;

modify the periodic rate of the user subscription information based at least in part on the estimated replenishment date and the determination that the user has initiated the manual order, wherein modifying the user subscription information is independent of user action and reduces a likelihood of the user initiating an additional manual order for the one or more items thereby reducing network traffic at the electronic marketplace; and generate a plurality of automated orders causing the particular items to be shipped to the plurality of users.

8. The system of claim 7, having further computer-executable instructions that, when executed with the processor, cause the system to at least receive user configuration information indicating an automatic order generation preference, wherein at least one of the plurality of automated orders is based at least in part on the user configuration information.

9. The system of claim 7, having further computer-executable instructions that, when executed with the processor, cause the system to at least determine a plurality of replenishment dates for the selected items based at least in part on the respective expiration dates.

10. The system of claim 9, having further computer-executable instructions that, when executed with the processor, cause the system to at least provide a notification to a user of the plurality of users based at least in part on at least one of the respective replenishment dates.

11. The system of claim 10, wherein the notification is provided to the user within a threshold amount of time prior to the at least one of the respective replenishment dates.

12. The system of claim 10, having further computer-executable instructions that, when executed with the processor, cause the system to at least:

receive user input related to the notification; and generate one or more additional orders based at least in part on the user input.

13. The system of claim 9, wherein selecting each of the plurality of items causes the system to at least:

identify a set of items having the item; and score the set of items based on respective expiration dates of the set of items, wherein the selection of each of the particular items is based at least in part on the score.

14. A non-transitory computer-readable storage medium having stored thereon computer-executable instructions that, when executed by a computer, cause the computer to perform operations comprising:

receiving, by a computer system, user subscription information identifying an item offered in an electronic marketplace, the item to be delivered to a user at a periodic rate according to the user subscription information;

obtaining past order history of a plurality of users comprising the user, the past order history indicating a plurality of previously-delivered items, the plurality of previously-delivered items being provided to respective users of the plurality of users at respective periodic rates, the previously-delivered items being associated with respective expiration dates;

determining estimated respective replenishment dates for the plurality of previously-delivered items based at least in part on the respective expiration dates;

determining that the user has initiated a manual order for the item;

modifying the periodic rate of the user subscription information based at least in part on the estimated respective replenishment dates and the determination that the user has initiated the manual order for the item, wherein modifying the user subscription information is independent of user action and reduces a likelihood of the user initiating an additional manual order for the one or more items thereby reducing network traffic at the electronic marketplace;

identifying a plurality of perishable items based at least in part on the modified user subscription information;

identifying a first plurality of expiration dates for the plurality of perishable items;

determining a particular perishable item of the plurality of perishable items to include in an automated order associated with the modified user subscription information, the particular perishable item being determined based at least in part on the first plurality of expiration dates of the plurality of perishable items, a plurality of second expiration dates of the plurality of previously-delivered items, and the respective periodic rates, wherein the particular perishable item is determined based at least in part on optimizing a plurality of orders comprising the plurality of perishable items; and generating, by the computer system, an automated order associated with the user based at least in part on the particular perishable item determined and the modified user subscription information.

15. The non-transitory computer-readable storage medium of claim 14, wherein the particular perishable item differs in at least one attribute from the plurality of previously-delivered items.

16. The non-transitory computer-readable storage medium of claim 14, having further computer-executable instructions that, when executed by a computer, cause the computer to perform operations comprising:

identifying a plurality of items associated with the particular perishable item to be delivered, the plurality of items being associated with a plurality of respective expiration dates; and selecting a subset of the plurality of items to be included in the automated order based at least in part on the plurality of respective expiration dates, the subset of the plurality of items being associated individually with differing expiration dates, the differing expiration dates spanning a period of time associated with the modified user subscription information.

17. The non-transitory computer-readable storage medium of claim 14, having further computer-executable instructions that, when executed by a computer, cause the computer to perform operations comprising:
   identifying a first perishable item located at a first warehouse, the first perishable item being a first candidate for inclusion in the automated order, the first item having a first expiration date;
   identifying a second perishable item located at a second warehouse, the second perishable item being a second candidate for inclusion in the automated order, the second perishable item having a second expiration date that is earlier than the first expiration date;
   selecting the second perishable item for inclusion in the automated order based at least in part on the second expiration date being earlier than the first expiration date; and
   initiating a workflow to cause the second perishable item to be transferred from the second warehouse to the first warehouse based at least in part on the second item being selected for inclusion in the automated order.

18. The non-transitory computer-readable storage medium of claim 17, having further computer-executable instructions that, when executed by a computer, cause the computer to perform operations comprising:
   modifying other user subscription information associated with a different user based at least in part on the second perishable item being selected for inclusion in the automated order associated with the user.

19. The non-transitory computer-readable storage medium of claim 14, having further computer-executable instructions that, when executed by a computer, cause the computer to perform operations comprising:
   modifying a first inventory of items at the first warehouse and a second inventory of items at the second warehouse based at least in part on the generated automated order, wherein modifying the first inventory and the second inventory reduces waste associated with expiration dates of the first inventory of items; and
   facilitating delivery of a set of items of the first inventory to the second warehouse, the set of items being added to the second inventory at the second warehouse.

* * * * *

UNITED STATES PATENT AND TRADEMARK OFFICE
CERTIFICATE OF CORRECTION

PATENT NO. : 10,078,860 B1  
APPLICATION NO. : 14/313100  
DATED : September 18, 2018  
INVENTOR(S) : Michael Frederick Masterman Page 1 of 1

It is certified that error appears in the above-identified patent and that said Letters Patent is hereby corrected as shown below:

On the Title Page

Item [57],  
Delete: "An automated order may be generate that cases the selected"  
Insert: --An automated order may be generated that causes the selected--

Signed and Sealed this  
Thirteenth Day of August, 2019

Andrei Iancu  
*Director of the United States Patent and Trademark Office*